(12) United States Patent
Kuo

(10) Patent No.: US 6,729,820 B2
(45) Date of Patent: May 4, 2004

(54) BLIND RIVET WITH BRAKING STRUCTURE

(75) Inventor: Wen Wen Kuo, Taoyuan Hsien (TW)

(73) Assignee: Sedate Trading Corporation (TW)

( * ) Notice: Subject to any disclaimer, the term of this patent is extended or adjusted under 35 U.S.C. 154(b) by 0 days.

(21) Appl. No.: 10/138,412

(22) Filed: May 6, 2002

(65) Prior Publication Data

US 2002/0168243 A1 Nov. 14, 2002

(30) Foreign Application Priority Data

May 10, 2001 (TW) .................................... 90207664 U

(51) Int. Cl.[7] ................................................ F16B 13/06
(52) U.S. Cl. .......................................... 411/43; 411/45
(58) Field of Search ........................ 411/41, 43, 45–48, 411/69

(56) References Cited

U.S. PATENT DOCUMENTS

| 3,267,205 A | * | 8/1966 | Dozier |
| 4,236,429 A | * | 12/1980 | Dolch |
| 4,309,137 A | * | 1/1982 | Tanaka |
| 4,407,619 A | * | 10/1983 | Siebol |
| 5,915,901 A | * | 6/1999 | Aasgaard |

\* cited by examiner

*Primary Examiner*—Flemming Saether
(74) *Attorney, Agent, or Firm*—Bacon & Thomas, PLLC

(57) ABSTRACT

A blind rivet. The blind rivet includes a rivet, a stopper, and a shaft. The rivet includes a cylindrical body and a brim at one end of the cylindrical body. The stopper includes a first end, a second end, and a cone connected between the first end and the second end. The first end includes a braking structure, and the shaft includes a neck extended from one end of the shaft body and connected to the second end of the stopper.

6 Claims, 2 Drawing Sheets

BLIND RIVET WITH BRAKING STRUCTURE

BACKGROUND OF THE INVENTION

1. Field of the Invention

The present invention relates to blind rivets and, more particularly, to an improved structure of blind rivet.

2. Description of Related Art

Blind rivets are adapted to join multiple thin-layer members. They can be used to join building construction materials, to bind loose-leaf clip, to secure attachments to the shell of an electric home appliance, to fix plastic advertising boards.

Conventional blind rivets are made of metallic materials for the advantage of high rigidity and stability. However, a metallic blind rivet is electrically conductive, expensive, and easy to become covered with rust. Further, plastic blind rivets are also commercially available for use in certain conditions. The advantages of plastic blind rivets include low manufacturing cost, high flexibility, waterproof and rustproof properties. However, a plastic blind rivet is less stable when installed. FIG. 3 shows a plastic blind rivet according to the prior art. When installed, the spherical head 50 has a part engaged into the rivet 60 and a part exposed to the outside of the rivet 60. The spherical head 50 tends to be moved backwards and disengaged from the rivet 60. Because plastic material becomes aged quickly under the radiation of the light of the sun, and because the plastic rivet expands when hot, the spherical head 50 tends to be forced out of the rivet 60 a certain length of time after the use of the blind rivet.

Therefore, it is desirable to provide an improved structure of blind rivet to mitigate and/or obviate the aforementioned problems.

SUMMARY OF THE INVENTION

It is one object of the present invention to provide a blind rivet, which can be quickly installed to positively secure the work pieces together. It is another object of the present invention to provide a plastic blind rivet, which eliminates the drawbacks of the conventional plastic blind rivets. According to the present invention, the blind rivet is comprised of a rivet, a stopper, and a shaft. The rivet comprises a cylindrical body, a receiving hole axially extended through the cylindrical body, and a brim outwardly projecting from the periphery of one end of the cylindrical body. The stopper comprises a first end, a second end, and a cone connected between the first end and the second end. The first end of the stopper comprises a braking structure, which prohibits the stopper from backward movement after its installation in the receiving hole of the rivet. The braking structure is formed of a coarse surface of the first end of the stopper and at least one annular retaining flange extended around the periphery of the first end of the stopper. The shaft comprises a shaft body and a neck extended from one end of the shaft body and connected to the second end of the stopper. The breaking strength of the neck is smaller than that of the shaft body, so that continuously pulling the shaft after engagement of the stopper in the receiving hole of the rivet causes the neck to break. Therefore, the shaft body of the shaft can be separated from the stopper. The neck of the shaft can have any of a variety of shapes. The breaking strength of the neck must be tested and inspected. The breaking strength testing and inspecting procedures are of the known art and not within the scope of the present invention. Normally, the outer diameter of the neck of the shaft is smaller than the outer diameter of the second end of the stopper. Further, the shaft can be formed integral with the second end of the stopper. According to the present invention, the stopper can be engaged into the receiving hole of the rivet and kept from sight. To fit different installation requirements, the blind rivet can be a metallic blind rivet, or a plastic blind rivet. Further, the blind rivet can be made having any of a series of sizes.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
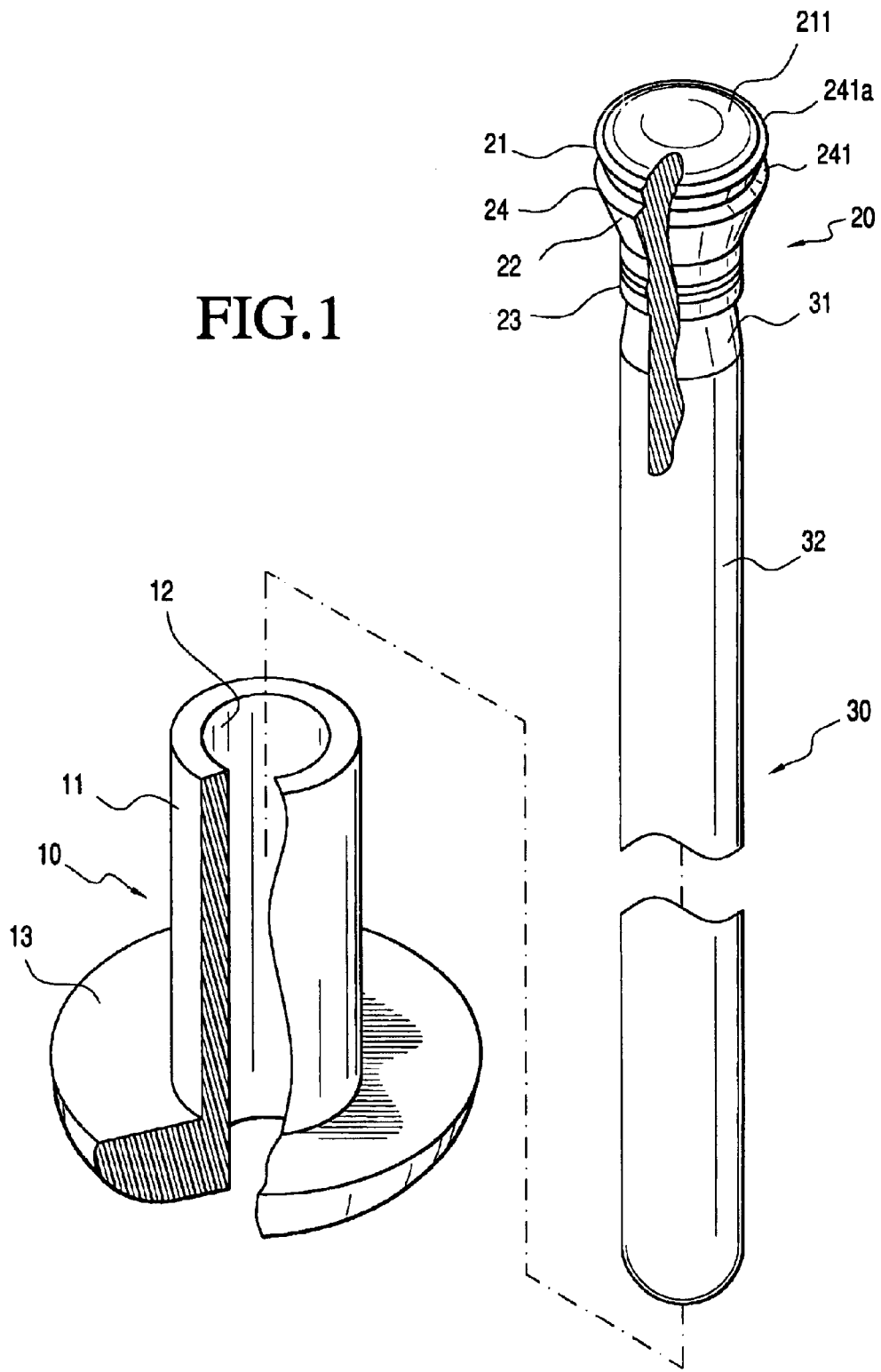
FIG. 1 is an exploded, partially cutaway view of a blind rivet according to the present invention.
Figure 2:
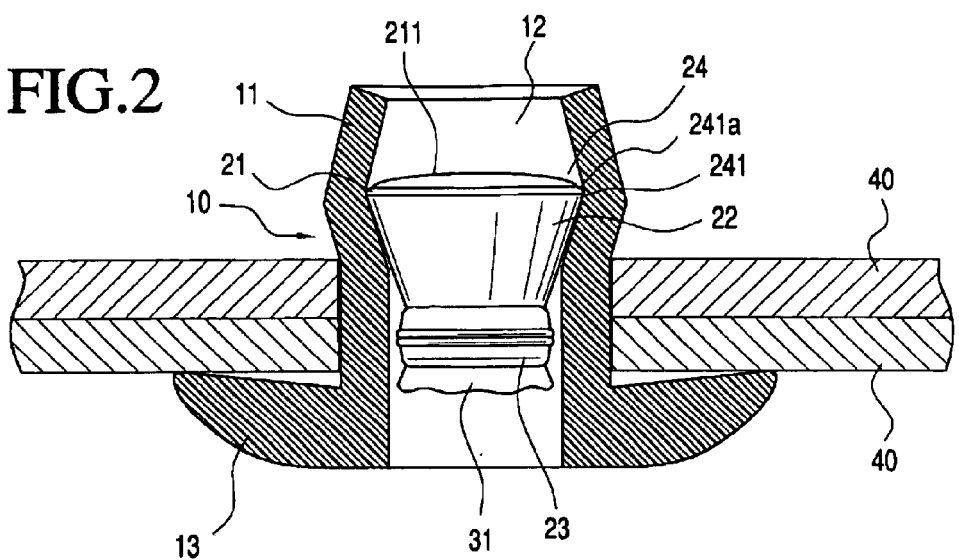
FIG. 2 is a sectional view showing an installation example of the present invention.
Figure 3:
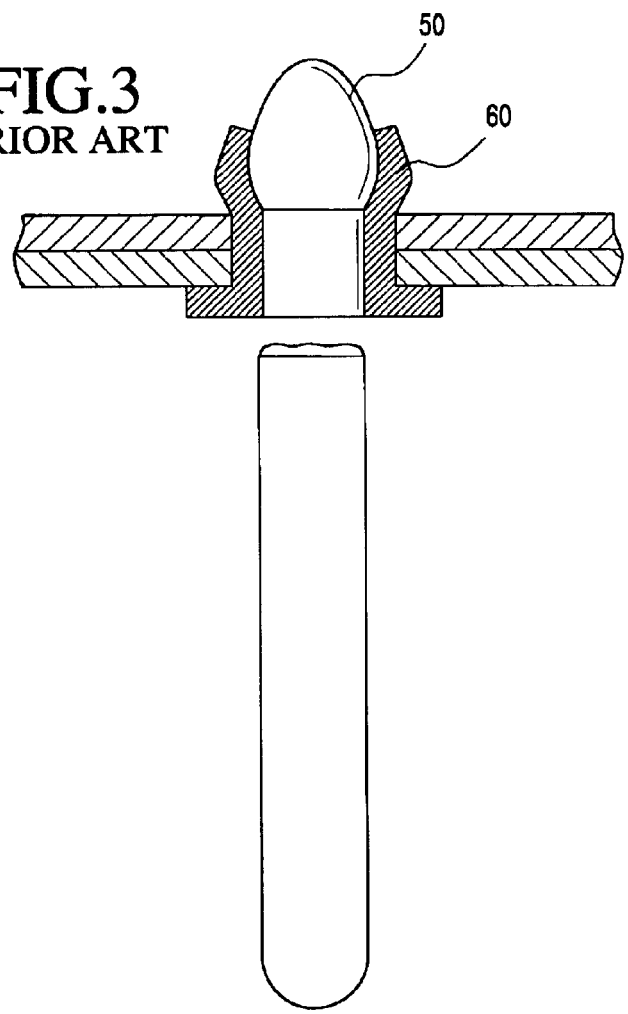
FIG. 3 is a sectional view showing the use of a prior art blind rivet.

Referring to FIGS. 1 and 2, a blind rivet in accordance with the present invention is generally comprised of a rivet 10, a stopper 20, and a shaft 30. The rivet 10 comprises a cylindrical body 11, a receiving hole 12 axially extending through the body 11, and a brim 13 outwardly projecting from the periphery of one end of the body 11. The stopper 20 comprises a first end 21, a cone 22, and a second end 23. The cone 22 is connected between the first end 21 and the second end 23. The first end 21 of the stopper 20 has a braking structure 24. According to the embodiment shown in FIG. 1, the braking structure 24 is comprised of two annular retaining flanges 241, 241a respectively extended around the periphery of the first end 21 at different elevations. The shaft 30 comprises a shaft body 32 and a neck 31 at one end of the shaft body 32. The neck 31 of the shaft 30 is axially connected to the second end 23 of the stopper 20. According to the embodiment shown in FIG. 1, the shaft 30 is formed integral with the second end 23 of the stopper 20.

Referring to FIGS. 1 and 2 again, when in use, the rivet body 11 of the rivet 10 is inserted through a respective through hole on each of the sheet members 40 to be fastened together, keeping the brim 13 stopped at one side of the stack of sheet members 40, and then the shaft 30 is inserted through the receiving hole 12 of the rivet 10 and pulled (by means of a rivet gun). When pulling the shaft 30, the cone 22 of the stopper 20 is forced to expand the receiving hole 12 of the rivet 10, and the braking structure 24 of the first end 21 of the stopper 20 is forced into engagement with the receiving hole 12, and therefore the sheet members 40 are firmly secured together by the deformed rivet 10. Continuously pulling the shaft 30 causes the neck 31 to break, enabling the shaft body 32 to be separated from the rivet 10 and the sheet members 40.

Referring to FIG. 2, after installation, the first end 21, cone 22 and second end 23 of the stopper 20 are positioned in the receiving hole 12 of the rivet 10 and kept from sight. Further, the first end 21 of the stopper 20 has a flat top face 211. Because the rivet 10 is a flexible member molded from plastics, it positively grasps the stopper 20.

A prototype of blind rivet has been constructed with the features of FIGS. 1 and 2. The blind rivet functions smoothly to provide all of the features discussed earlier.

Although a particular embodiment of the invention has been described in detail for purposes of illustration, various modifications and enhancements may be made without departing from the scope of the invention. Accordingly, the invention is not to be limited except as by the appended claims.

What is claimed is:

1. A blind rivet comprising:

a rivet, said rivet comprising a cylindrical body, a receiving hole axially extending through said cylindrical body, and a brim outwardly projecting from the periphery of one end of said cylindrical body;

a stopper, said stopper comprising a first end, a second end, and a cone connected between said first end and said second end, said first end comprising a braking structure adapted to stop said stopper in said receiving hole of said rivet;

a shaft connected to said stopper and inserted through the receiving hole of said rivet for pulling said stopper into said receiving hole of said rivet to expand said cylindrical body, said shaft comprising a shaft body inserted through the receiving hole of said rivet and a neck extended from one end of said shaft body and connected to the second end of said stopper; and wherein said braking structure of said stopper comprises two annular retaining flanges extended around the periphery of said first end of said stopper at different elevations.

2. The blind rivet as claimed in claim 1, wherein said braking structure of said stopper comprises at least one annular retaining flange extended around the periphery of said first end of said stopper.

3. The blind rivet as claimed in claim 1, wherein the first end, cone and second end of said stopper are engaged into the inside of the receiving hole of said rivet.

4. The blind rivet as claimed in claim 3, wherein said cone of said stopper is forced to expand said cylindrical body of said rivet and said braking structure is forced into engagement with said receiving hole of said rivet when pulling said stopper into said receiving hole of said rivet.

5. The blind rivet as claimed in claim 1, wherein said shaft is formed integral with the second end of said stopper.

6. The blind rivet as claimed in claim 1, wherein said rivet is molded from plastics, and the first end of said stopper has a flat top face.

* * * * *